United States Patent
Tabata et al.

[11] Patent Number: 5,975,732
[45] Date of Patent: Nov. 2, 1999

[54] MOTORCYCLE HEADLIGHT

[75] Inventors: Hajime Tabata; Toshiya Nagatuyu; Tetsuya Suzuki; Yosihisa Hirose, all of Saitama, Japan

[73] Assignee: Honda Giken Kogyo Kabushiki Kaisha, Tokyo, Japan

[21] Appl. No.: 08/972,885

[22] Filed: Nov. 18, 1997

[30] Foreign Application Priority Data

Nov. 18, 1996 [JP] Japan .................................. 8-306887

[51] Int. Cl.⁶ .................................................. B60Q 1/00
[52] U.S. Cl. ........................ 362/539; 362/538; 362/475
[58] Field of Search .................................. 362/539, 538, 362/475, 509, 351

[56] References Cited

U.S. PATENT DOCUMENTS

| 4,870,545 | 9/1989 | Hatanaka et al. . | |
| 5,158,352 | 10/1992 | Ikegami et al. | 362/539 |
| 5,171,082 | 12/1992 | Watanabe . | |

FOREIGN PATENT DOCUMENTS

| 0273353-A2 | 7/1988 | European Pat. Off. . | |
| 273353A2 | 12/1988 | European Pat. Off. | 362/538 |
| 0661193-A1 | 7/1995 | European Pat. Off. . | |
| 3718642C1 | 10/1988 | Germany | 362/538 |
| Y2-59-13685 | 4/1984 | Japan . | |
| A-63-312280 | 12/1988 | Japan . | |

Primary Examiner—Nimeshkumar D. Patel
Assistant Examiner—Todd Reed Hopper
Attorney, Agent, or Firm—Birch, Stewart, Kolasch & Birch, LLP

[57] ABSTRACT

A light distribution screen is constructed of a main light distribution region including a main optical axis, a low light intensity region darker than an upper part of the main light distribution region, and high light intensity regions brighter than an upper region of the low intensity region. A corner can be brightly illuminated when the motorcycle is cornering, which means that the visibility of the corner can be improved and oncoming traffic is not dazzled when the motorcycle is travelling straight on.

16 Claims, 17 Drawing Sheets

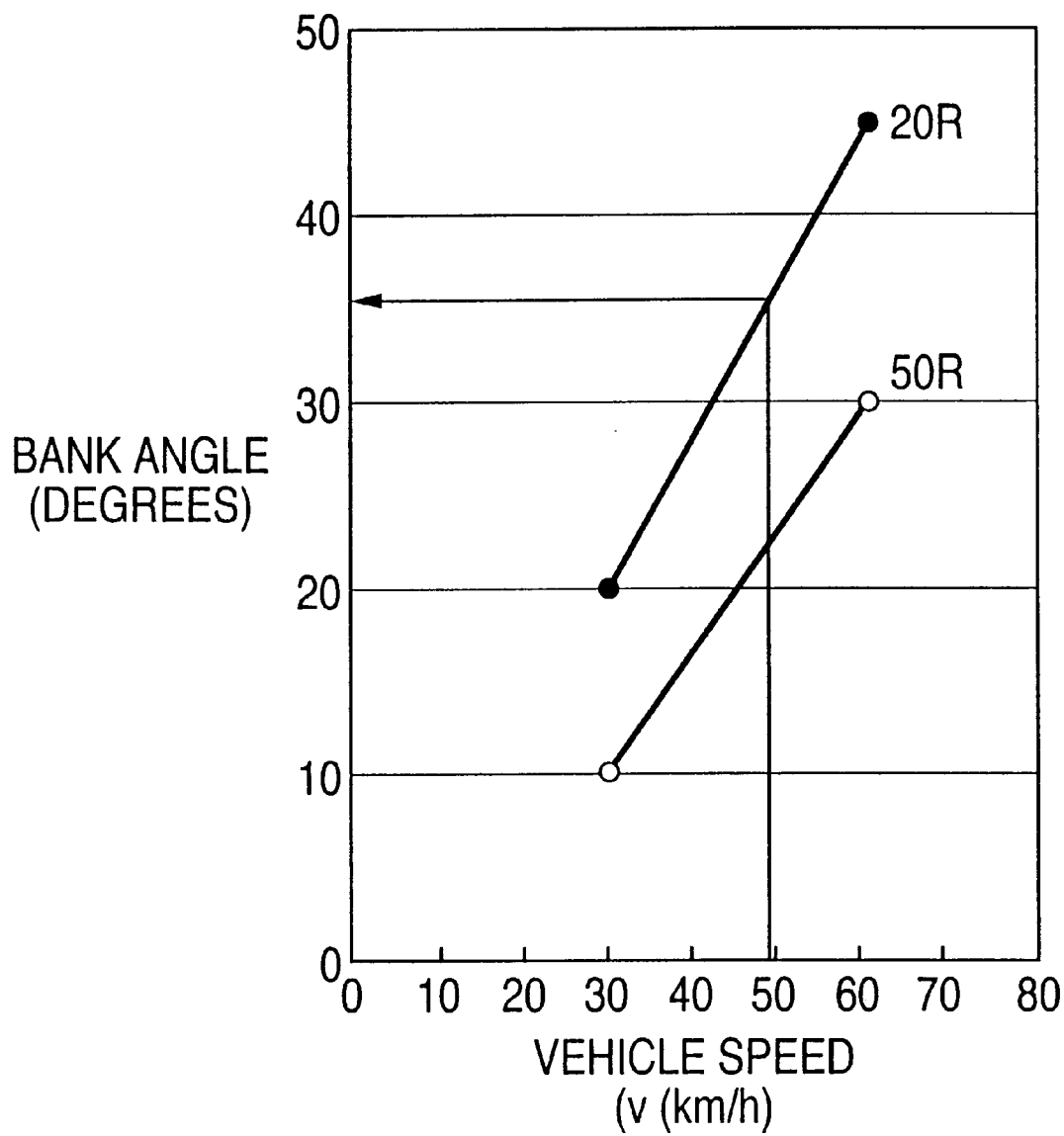

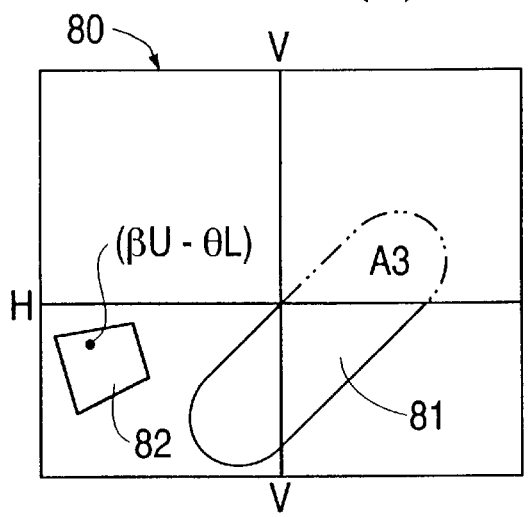
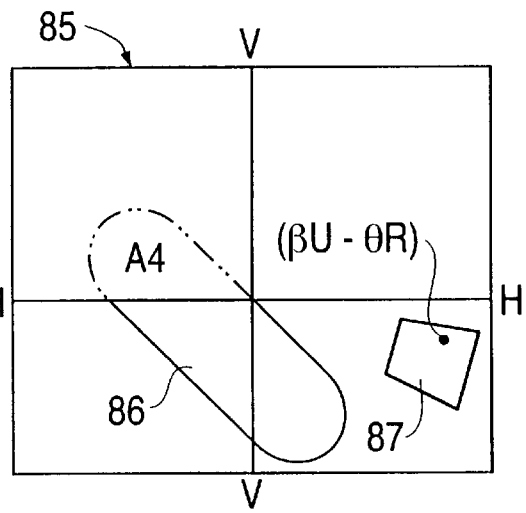
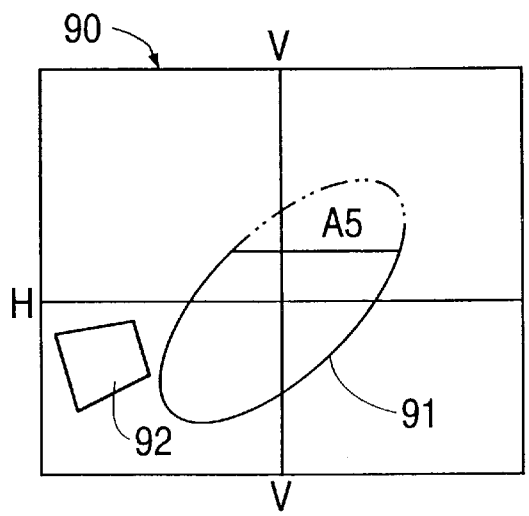
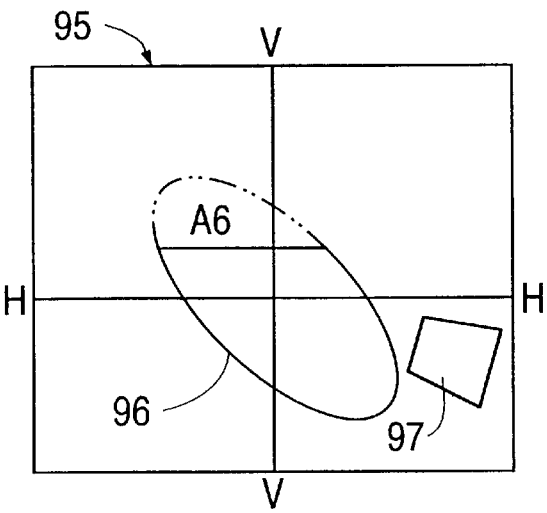

MOTORCYCLE HEADLIGHT

BACKGROUND OF THE INVENTION

1. Field of the Invention

The present invention relates to a motorcycle headlight in for improving light distribution at the time of cornering.

2. Description of Background Art

FIG. 21(a) and FIG. 21(b) are overhead views illustrating the light distribution for a dimmed beam of a conventional motorcycle headlight. FIG., 21(a) illustrates a motorcycle when travelling in a straight line while FIG. 21(b) illustrates the case when cornering.

In FIG. 21(a), the headlight 100 shines light having a left and right spread on the road surface in the relative foreground in front of the motorcycle so as not to dazzle vehicles coming in the opposite direction.

In FIG. 21(b), during cornering, the motorcycle 101 leans into the corner, and a portion 103 of the light distribution inside the corner moves to the side of the motorcycle 101.

FIG. 22(a) and FIG. 22(b) are overhead views illustrating light distribution of a main beam of a conventional motorcycle headlight. FIG. 22(a) illustrates a motorcycle travelling in a straight direction, while FIG. 22(b) illustrates a motorcycle when cornering.

In FIG. 22(a), the headlight 100 illuminates the road surface along a distance in front of the motorcycle 101. In FIG. 22(b), during cornering, the motorcycle 101 leans into the corner and a portion 103 of the light distribution 102 inside the corner moves to the side of the motorcycle 101.

FIG. 23(a) and FIG. 23(b) illustrate a light distribution screen for a conventional motorcycle headlight at the time of cornering.

FIG. 23(a) corresponds to the dimmed beam in FIG. 21(b) while FIG. 23(b) corresponds to the travelling straight beam in FIG. 22(b), and the main light distribution region 104 of FIG. 23 (a) and the main light distribution region 105 of FIG. 23(b) both slope downwardly to the left.

As shown in FIG. 21(b) and FIG. 22(b), the amount of light reaching the shoulder 107 of a corner seen by the rider 106 of the motorcycle 101 during cornering, and the amount of light reaching the road surface 108 ahead of the shoulder 107 is reduced, and these regions become dark. That is, at the time of cornering, because there is no light distributed in the ranges A1 and A2 in FIG. 23(a) and FIG. 23(b), which include the shoulder 107 and the road surface 108, there is a need to improve the forward 25 visibility of the corner by distributing light in these ranges A1 and A2.

Also, in Japanese Utility Model Publication Sho 59-13685, entitled "Headlight for Vehicle", and Japanese Patent publication Sho 63-312280 entitled "Headlight for Motorcycle", techniques for adjusting light distribution using lenses and reflectors are disclosed, but with respect to lighting up a corner during cornering, insufficient consideration is given to where and at what brightness light is irradiated.

SUMMARY AND OBJECTS OF THE INVENTION

Therefore, an object of the present invention is to provide a headlight for a motorcycle which enables an improvement in the visibility of a corner during cornering.

In order to achieve the above described object, the present invention defines a main light distribution region including a main optical axis. In addition, a low light intensity region darker than an upper part of said main light distribution region is provided. Further, a high light intensity region which is brighter than an upper region of said low intensity region is provided.

When the motorcycle is cornering, it is possible to brightly light up the corner, and it is possible to improve the visibility of the corner, as well as to prevent the dazzling of oncoming vehicles when travelling straight ahead.

In the present invention, the high light intensity region is provided with a region where the light distribution is at least 200 candela at an upper side from 4U. Thus, it is possible to ensure sufficient brightness when cornering.

In the present invention, the high light intensity region is outside 1OR and outside 1OL. It is possible to prevent light from the high light intensity region entering the rearview mirror of a car or motorcycle stopped in front, when waiting at a traffic light, etc.

In the present invention, the high light intensity region does not exceed 1000 candela. Light from the high intensity light region substantially does not dazzle oncoming vehicles.

The headlight carries out light distribution using a plurality of prisms formed in a lens, and the high light intensity region is formed using at least some of the prisms. The high light intensity region can be formed easily.

The headlight is a projector type, and the high light intensity region is formed by providing non-shielded portions in a light shielding section contained inside the headlight, in order to form a dimmed beam pattern.

It is possible to form the high light intensity region easily, and it is possible to effectively utilize shielded light.

In the present invention, the headlight is either a multi-reflector type having a plurality of reflecting surfaces formed in a reflector, or a single curved surface reflector type having a reflecting surface of a reflector as a single curved surface, and said high light intensity region is formed at part of said reflector. The high light intensity region can be formed easily.

Part of the reflector of the present invention is divided, this divided portion is constructed so as to be movable from a first position when a vehicle is travelling straight on to a second position when the vehicle is cornering, and the high light intensity region is formed at the second position.

It is possible to form the high light intensity region using light at a place where light distribution becomes unnecessary when a vehicle is cornering or light at a place that is too bright, and it is possible to effectively utilize the light.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a light distribution screen for a dimmed beam of the first embodiment of the motorcycle headlight according to the present invention when travelling straight on;

FIG. 4 is a light distribution screen for a main beam of a first embodiment of the motorcycle headlight according to the present invention when travelling straight on;

FIG. 10 is a graph for obtaining light distribution of the headlight of the present invention;

FIGS. 18(a) and 18(b) are drawings illustrating a light distribution screen of the fourth embodiment of the headlight according to the present invention, when travelling straight on;

FIGS. 19(a) and 19(b) are drawings illustrating a light distribution screen for a dimmed beam of the fourth embodiment of the headlight according to the present invention, when cornering;

FIGS. 20(a) and 20(b) are drawings illustrating a light distribution screen for a main beam of the first embodiment of the headlight according to the present invention, when cornering;

DETAILED DESCRIPTION OF THE PREFERRED EMBODIMENTS

Figure 1:
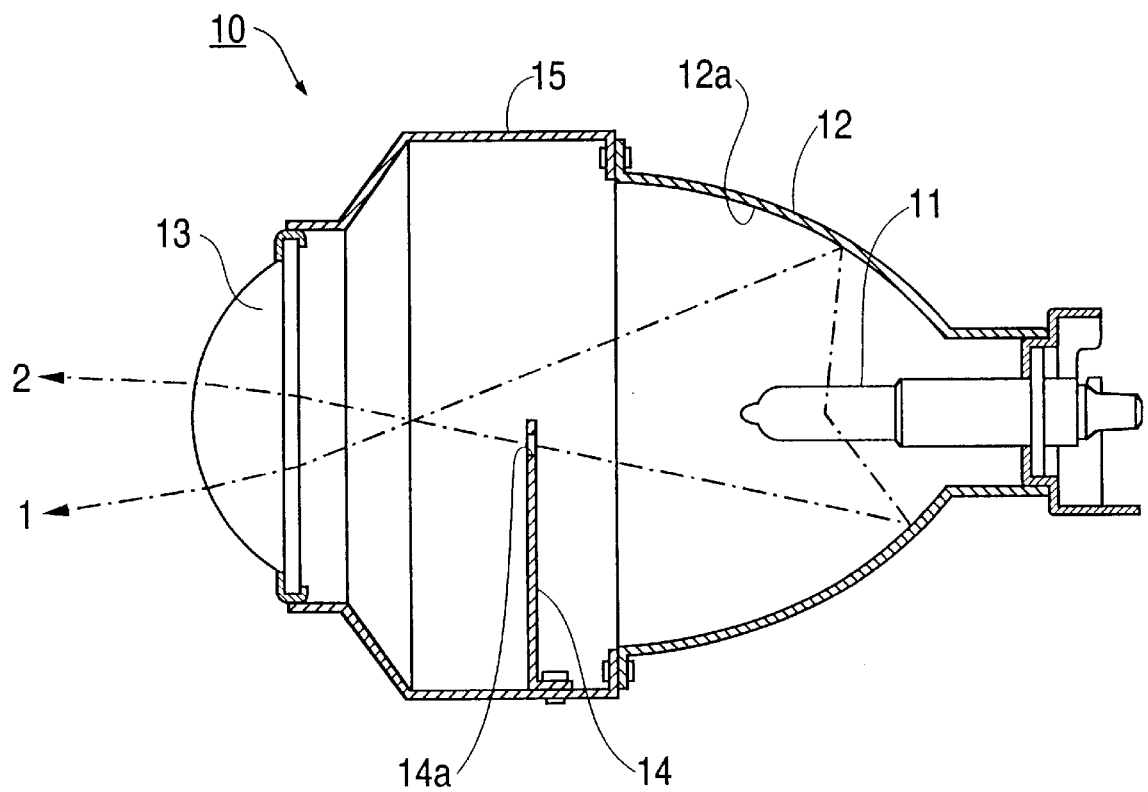
FIG. 1 is a cross-sectional drawing illustrating a first embodiment of a motorcycle headlight according to the present invention.

Embodiments of the present invention will now be described based on the attached drawings. FIG. 1 is a cross sectional diagram of a first embodiment of a motorcycle headlight according to the present invention. The headlight 10 is a projector type including of a lightbulb 11, a reflector 12, a lens 13, and a light shielding section 14 provided between the lightbulb 11 and the lens 13. A cylindrical member 15 is provided which surrounds the light shielding section 14.

The light shielding section 14 shields light reflected by a reflecting surface 12a at the under half of the reflector 12, and forms a dimmed beam pattern in which light does not reach to an upper region in a horizontal direction. The light shielding section 14 includes windows 14a, which are non-shielded regions, at an upper portion, two windows 14a, 14a, are aligned in a direction orthogonal to the sheet of the drawing, but one side has been omitted.

Light output from the lightbulb 11 and reflected by the upper reflecting surface 12a of the reflector 12 passes through the lens 13, and travels downwardly from a horizontal direction as shown by (1) in FIG. 1. Also, some of the light reflected by the lower reflecting surface 12a of the reflector 12 passes through the windows 14a in the light shielding section 14 and the lens 13 and travels as shown at (2) in FIG. 1. This light forms the high light intensity region, as will be described later.

Figure 2:
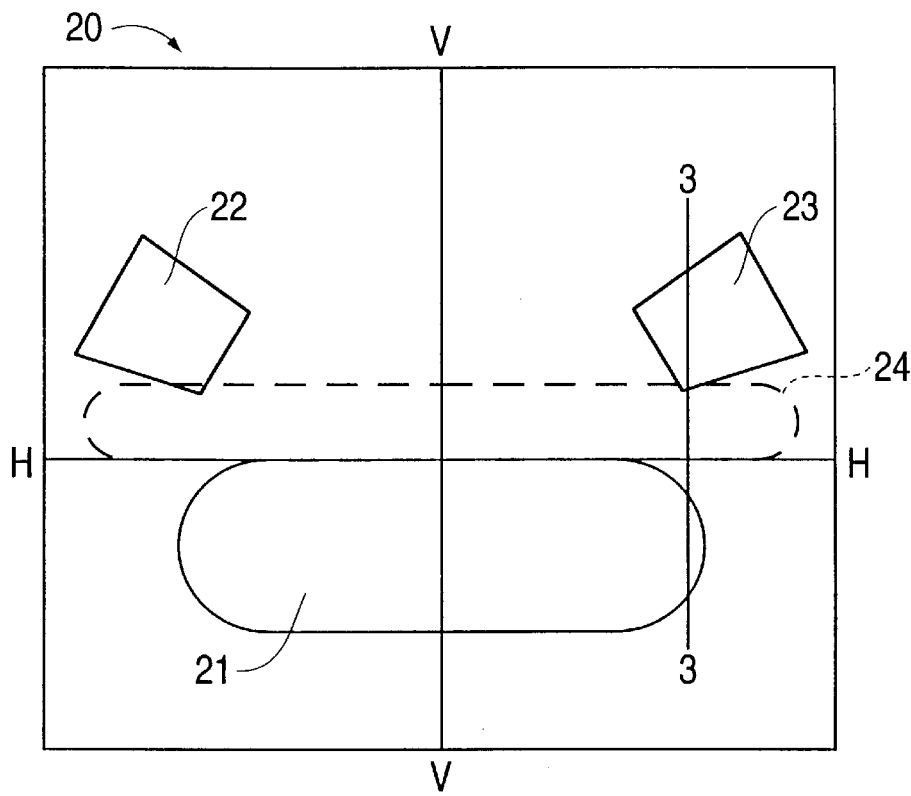

FIG. 2 illustrates a light distribution screen for a dimmed beam in the first embodiment of the present invention when travelling straight on, in which the light distribution screen 20 of the headlight 10, as illustrated in FIG. 1, comprises a main light distribution region 21 positioned below a line H which includes a main optical axis. High intensity light regions 22 and 23 are located above the line H and are positioned on both sides of a line V. A low light intensity region 24 is formed between the main light distribution region 21 and the high intensity light regions 22 and 23.

Figure 3:
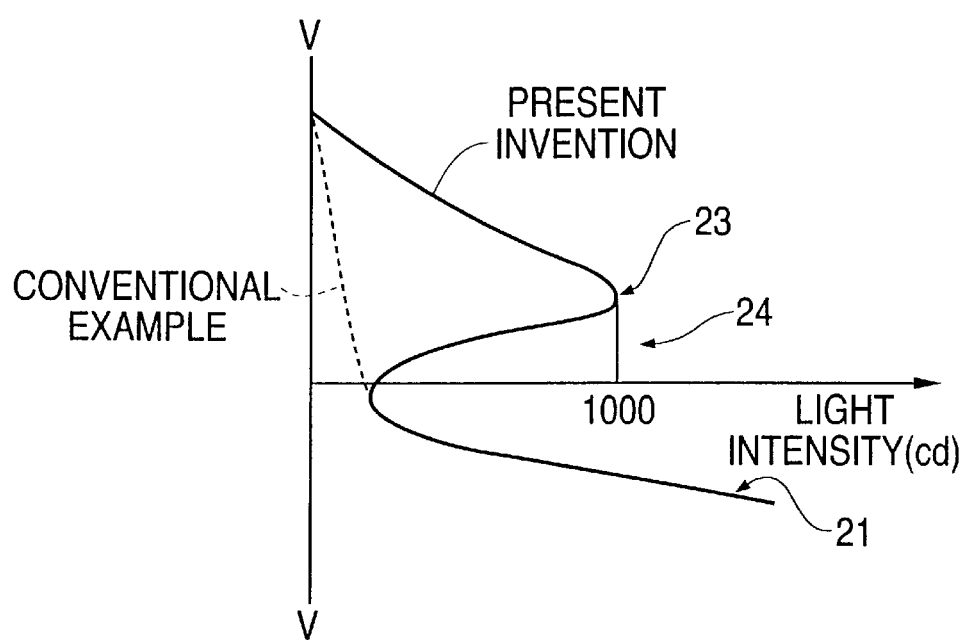
FIG. 3 is a drawing illustrating light intensity distribution for line 3—3 in FIG. 2.

FIG. 3 illustrates the light intensity distribution along a line 3—3 in FIG. 2, and illustrates that the light intensity of the high light intensity region 23 (and 22) of the present invention satisfies the minimum required values of 0.5U 1.5L "U" conventionally designating degrees up and "L" or "RR" designating degrees left or right, respectively, for dazzle prevention for a dimmed beam according to American SAE standard J584 (DEC 83) and the control value of 1000 candela MAX for outside those regions (passing on the right side), for example, not exceeding 1000 candela. Also, the high light intensity region 23 (and 22) is provided with a portion of at least 200 candela at an upper side of 4U.

Figure 4:
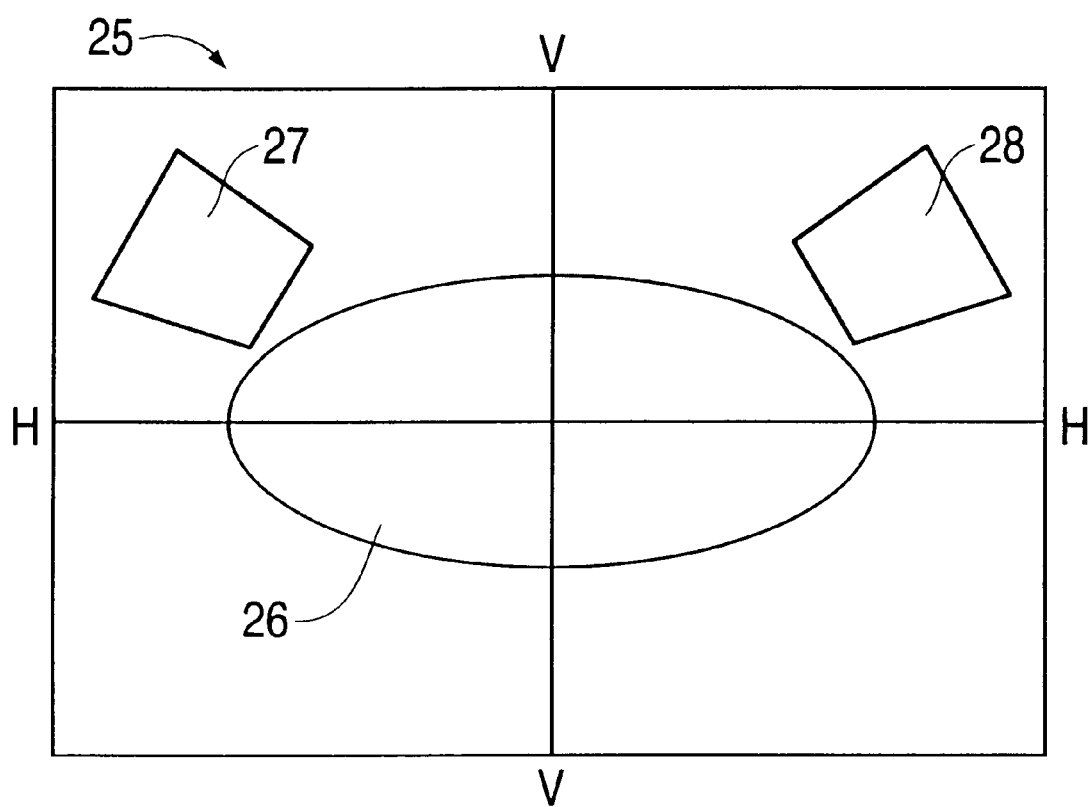

FIG. 4 illustrates a light distribution screen for a main beam in the first embodiment of the present invention when travelling straight on, in which the light distribution screen 25 of the headlight 10, as illustrated in FIG. 1, comprises an elliptical main light distribution region 26 having a long axis on the line H, and a short axis on the line V. High light intensity regions 27 and 28 are located above the left and right ends of the main light distribution region 26.

Figure 5A:
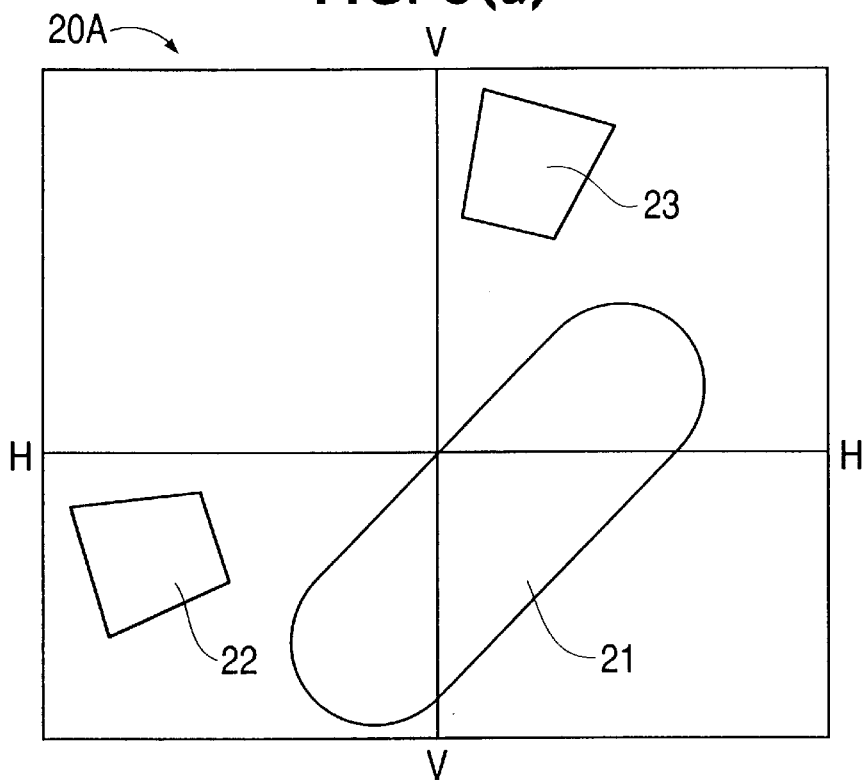
FIGS. 5(a) and 5(b) are light distribution screens for a dimmed beam of the first embodiment of the motorcycle headlight according to the present invention when cornering.
Figure 5B:
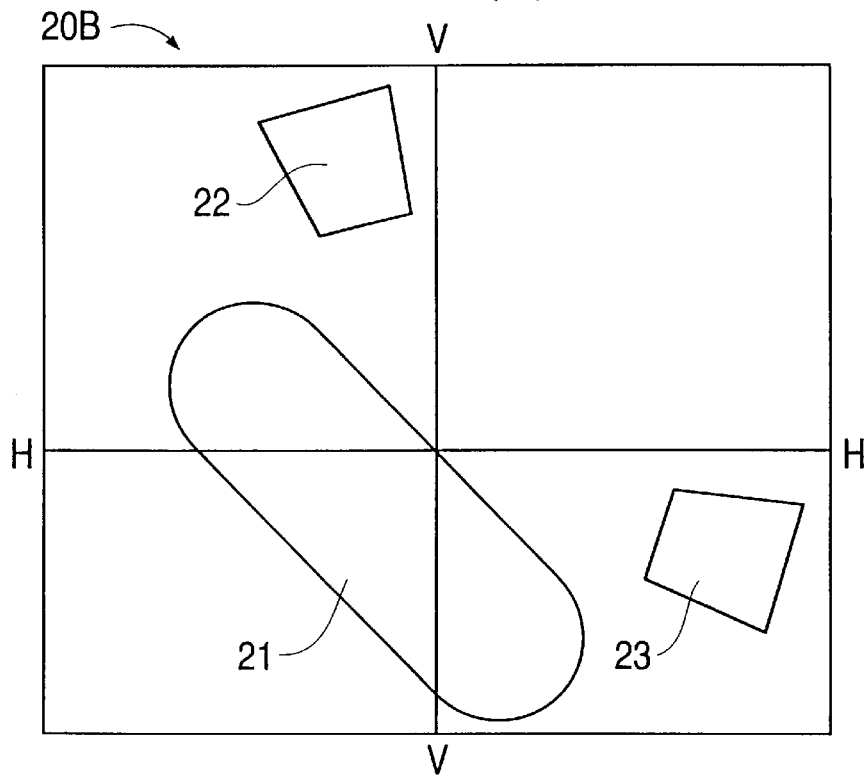

Next, operation of the above described headlight 10 will be described. FIGS. 5(a) and 5(b) illustrate light distribution screens for a dimmed beam of the first embodiment of the headlight of the present invention, when cornering. FIG. 5(a) illustrates the state when the headlight is leaning to the left, and FIG. 5(b) illustrates the state when the headlight is leaning to the right.

In FIG. 5(a), when the motorcycle is in the middle of cornering around a left corner, the frame of the motorcycle is leaned to the left. As a result, the headlight also leans. At that time, the high light intensity region 22 of the light distribution screen 20A moves lower than the line H. This position of the high light intensity region 22 corresponds to the shoulder of the corner and the road surface in front of the shoulder, as will be described later.

In FIG. 5(b), when the motorcycle is in the middle of cornering around a right corner, the frame of the motorcycle is leant to the right, opposite to FIG. 5(a), the headlight 10 leans to the right. The high light intensity region 23 of the light distribution screen 20B moves lower than the line H. The position of this high light intensity region 23 also corresponds to the shoulder of the corner and the road surface in front of the shoulder.

Figure 6A:
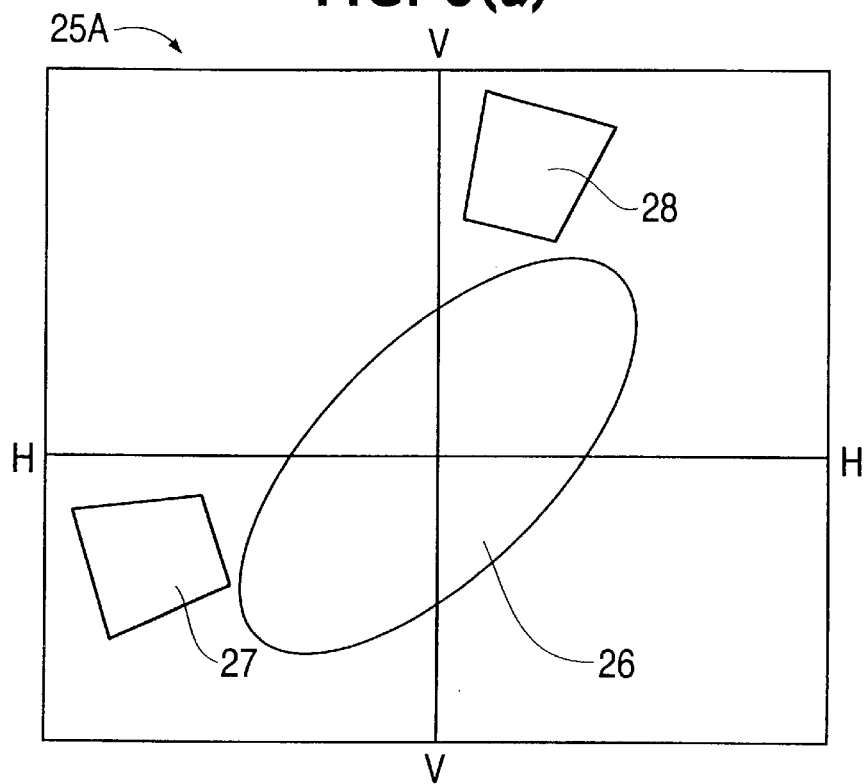
FIGS. 6(a) and 6(b) are light distribution screens for a main beam of the first embodiment of the motorcycle headlight according to the present invention when cornering.
Figure 6B:
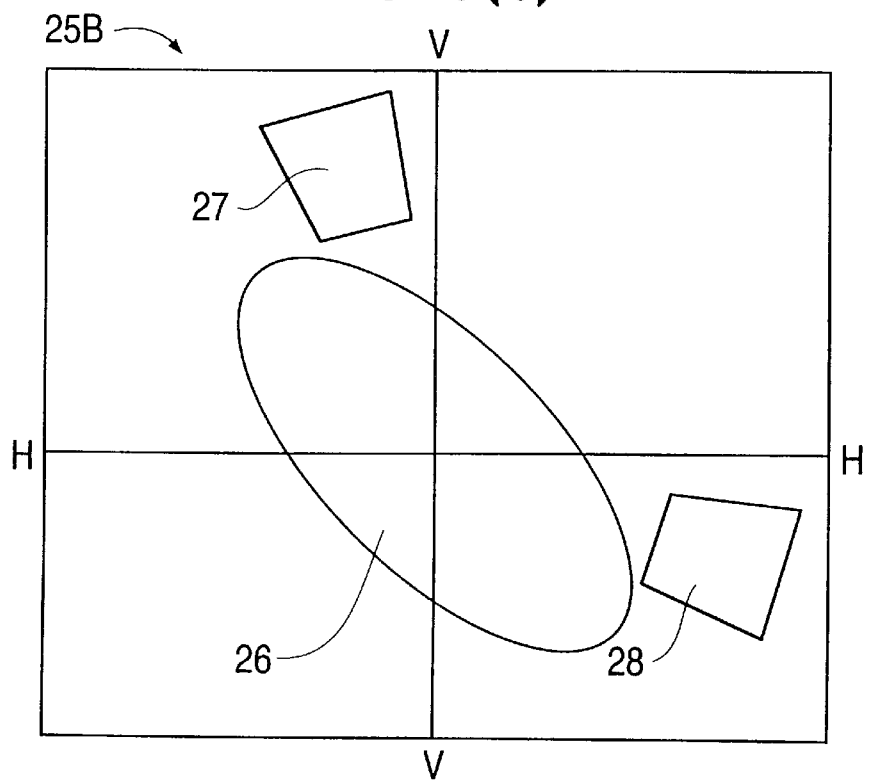

FIG. 6(a) and FIG. 6(b) illustrate light distribution screens for a main beam of the first embodiment of the headlight of the present invention, when cornering. FIG. 6(a) illustrates the state when the headlight is leaning to the left, and FIG. 6(b) illustrates the state when the headlight is leaning to the right.

In FIG. 6(a), when the motorcycle is in the middle of cornering around a left corner, the frame of the motorcycle leans to the left. As a result, the headlight 10, as illustrated in FIG. 1, also leans. At that time, the high light intensity region 27 of the light distribution screen 25A moves lower than the line H. This position of the high light intensity region 27 corresponds to the shoulder of the corner and the road surface in front of the shoulder, as will be described later.

In FIG. 6(b), when the motorcycle is in the middle of cornering around a right corner, the frame of the motorcycle leans to the right, the opposite to FIG. 6(a), the headlight 10 leans to the right, and the high light intensity region 28 moves lower than the line H. The position of this high light intensity region 28 also corresponds to the shoulder of the corner and the road surface in front of the shoulder.

Figure 7:
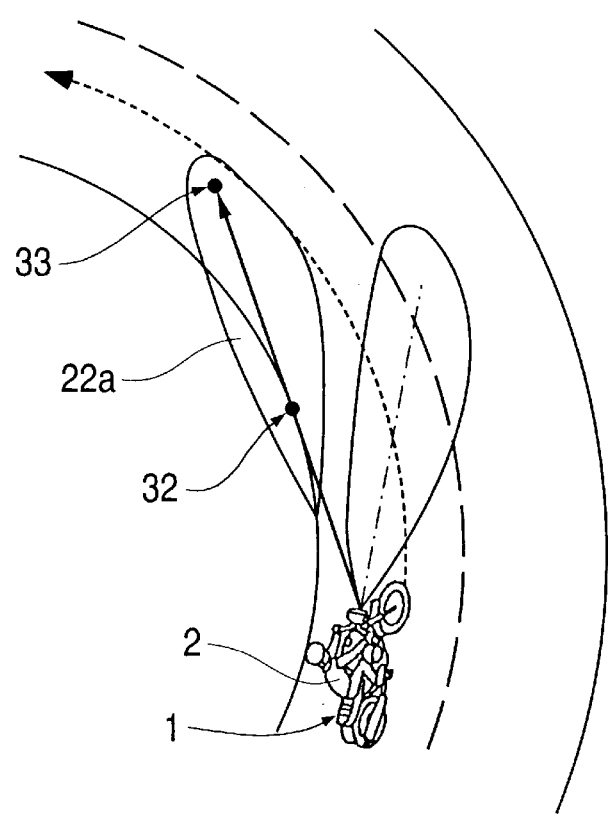
FIG. 7 is an overhead view of a motorcycle housing of the first embodiment of the headlight according to the present invention, during cornering.

FIG. 7 is an overhead view of a motorcycle that has been installed with a first embodiment of a headlight of the present invention, during cornering, and illustrates light distribution when the headlight is producing a dimmed beam, corresponding to the light distribution screen 20A of FIG. 5(a).

The motorcycle leans to the left, and the region 22a is illuminated. This region 22a corresponding to the high light intensity region 22 is the point on the shoulder 32 of the corner or the road surface 33 in front of the corner that the rider 2 is looking directly at when cornering. Because of this, it is possible to corner comfortably by brightly illuminates the region 22a.

Figure 8:
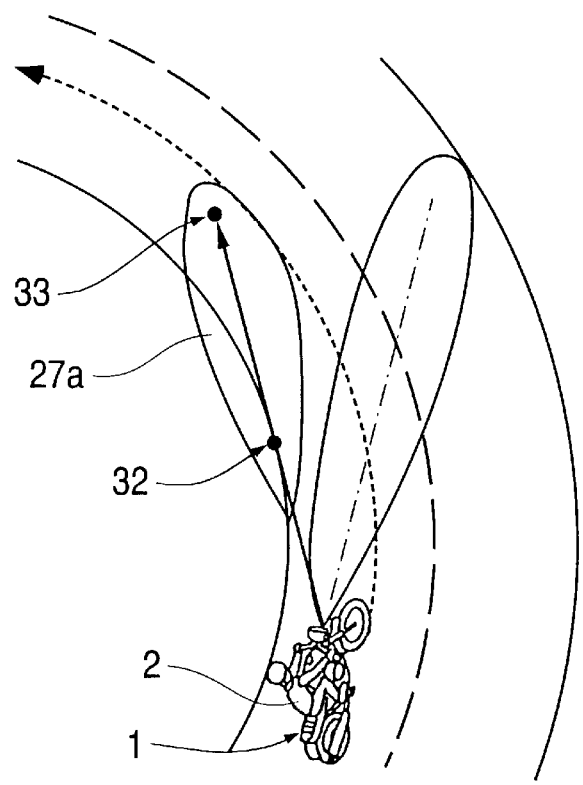
FIG. 8 is an overhead view of a motorcycle housing of the first embodiment of the headlight according to the present invention, during cornering.

FIG. 8 is an overhead view of a motorcycle that has been installed with a first embodiment of a headlight of the present invention, during cornering, and illustrates light distribution when the headlight is producing a main beam, corresponding to the light distribution screen 25A of FIG. 6(a).

The motorcycle leans to the left, and the region 27a is illuminated. This region 27a corresponding to the high light intensity region 27 is the point on the shoulder 32 of the corner or the road surface 33 in front of the corner that the rider 2 is looking directly at when cornering. Because of this, it is possible to corner comfortably by brightly illuminating the region 27a.

Next, the method of positioning and determining the light distribution of the high light intensity region described above will now be described in order.

Figure 9:
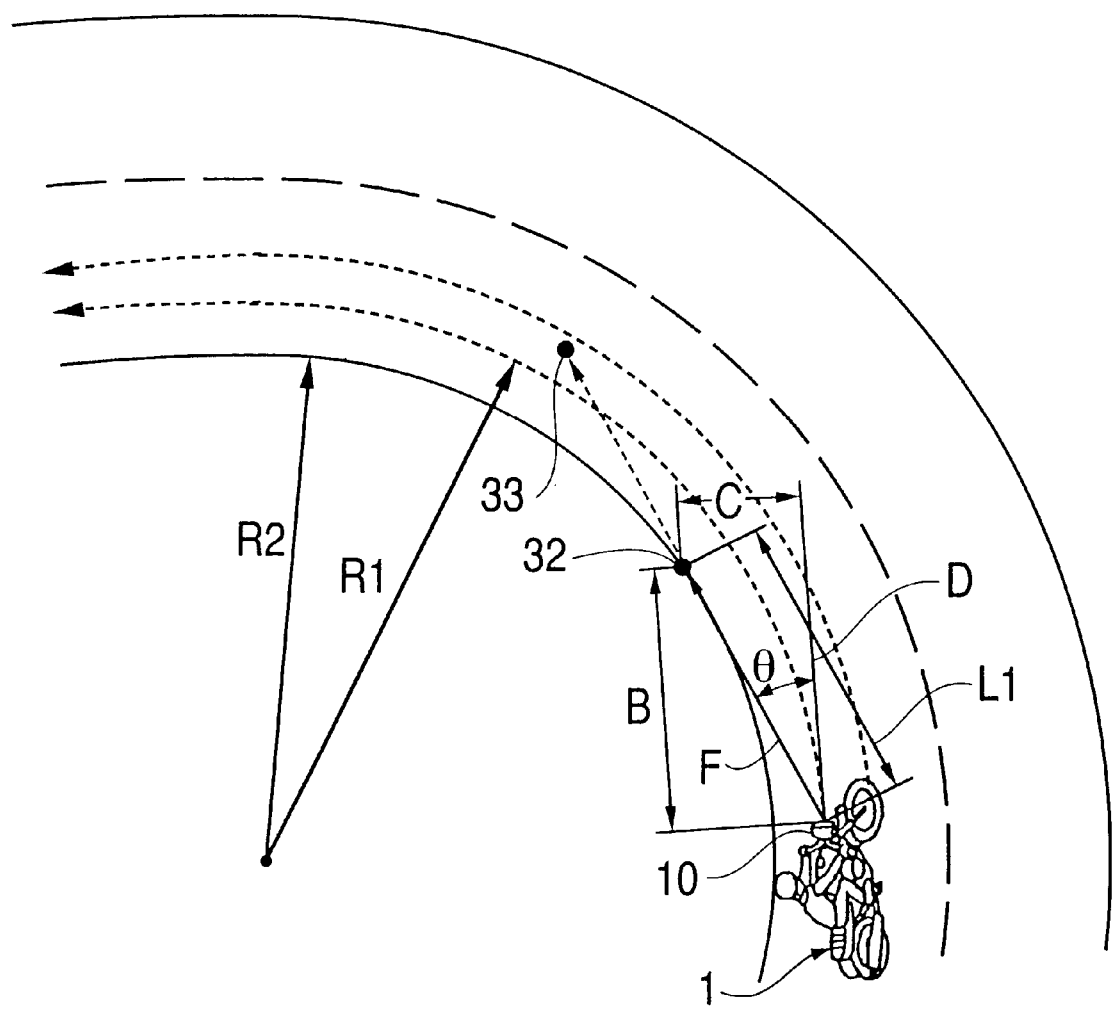
FIG. 9 is an overhead view explaining light distribution of the headlight of the present invention.

FIG. 9 is an overhead view explaining the light distribution of the headlight of the present invention, wherein a motorcycle 1 is travelling around a corner at a speed v.

At this time, it is assumed that the headlight 10 describes a locus of radius R1. Also, if the radius of the road shoulder is R2, and a straight line through the headlight 10 comes into contact with a point of the road shoulder 32, a distance B in the top to bottom direction of the drawing, and a distance C in the left to right direction of the drawing, from the headlight 10 to the road shoulder 32 can be obtained from the radii R1 and R2. Further, an angle e can be obtained which is formed by a straight line D extending in a forward horizontal direction from the headlight 10 on a central plane of the vehicle, and a straight line F linking between the headlight 10 and a point 32. Further, the length L1 of the straight line F can be obtained.

FIG. 10 is a graph for obtaining the light distribution of a headlight of the present invention, which illustrates the relationship between the speed of the motorcycle when cornering and a banking angle. The horizontal axis represents speed, while the vertical axis represents bank angle, and illustrates R1=20 m and 50 m as the previously described radius R1 of the locus of the headlight.

First of all, in this graph, the bank angle $\alpha$ is obtained from the speed v and the radius R1.

Figure 11A:
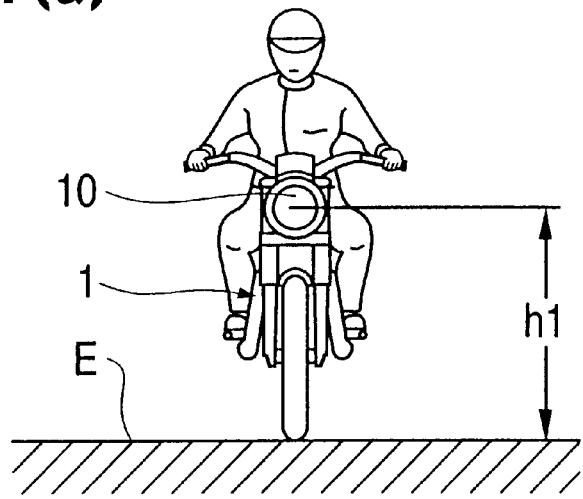
FIGS. 11(a) and 11(b) are front elevation views of a motorcycle for obtaining the light distribution of the headlight of the present invention.
Figure 11B:
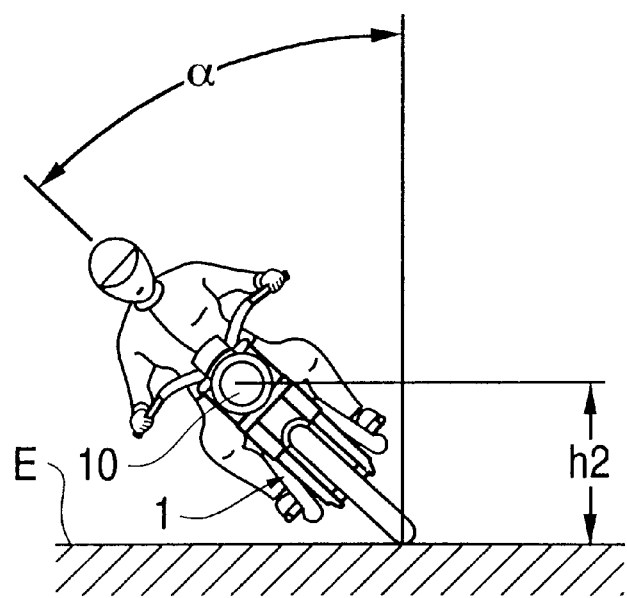

FIGS. 11(a) and 11(b) are front elevations of a motorcycle for obtaining the light distribution of the headlight of the present invention. FIG. 11(a) illustrates a motorcycle when travelling straight on, while FIG. 11(b) illustrates a motorcycle when cornering.

In FIG. 11(a) the height from the ground surface E to the headlight 10 is h1.

In FIG. 11(b), the height h2 from the ground surface E to the headlight at the time of cornering is obtained from the bank angle $\alpha$ at the time of cornering and the height hi in FIG. 11(a).

Figure 12:
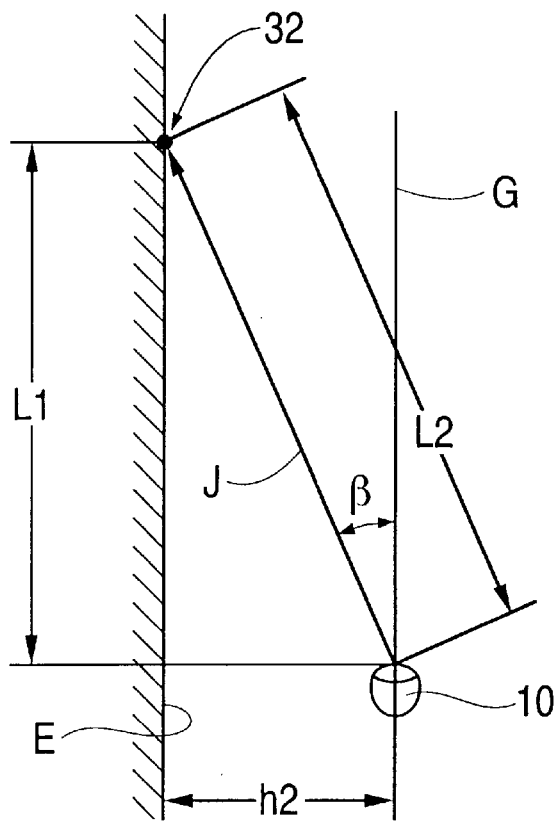
FIG. 12 is a schematic diagram for obtaining the light distribution of the headlight of the present invention.

FIG. 12 is a schematic view for obtaining the light distribution of the headlight of the present invention. For convenience, the left side of the drawing is the ground surface.

Here, it is possible to obtain an actual distance L2 from the headlight 10 to the road shoulder 32, and an angle $\beta$ formed by a line J connecting between the headlight 10 and the road shoulder 32, and a horizontal line G, shown in the vertical direction in the drawing, passing through the headlight 10 from the length L1 obtained in FIG. 9, and the height h2 obtained in FIG. 11.

Figure 13:
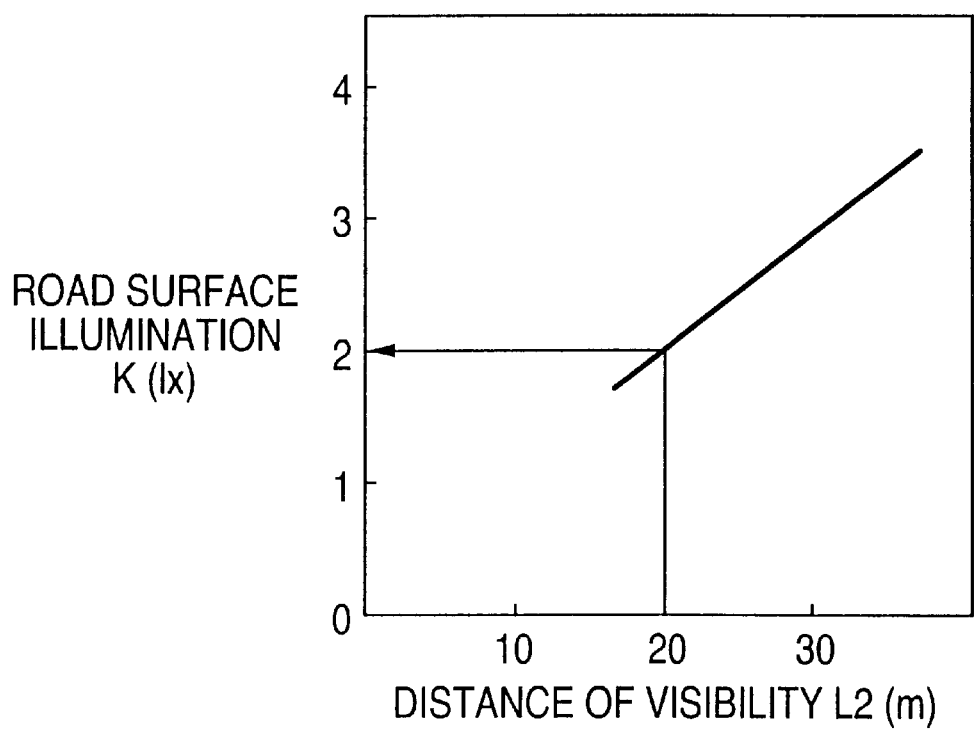
FIG. 13 is a graph for obtaining light distribution of the headlight of the present invention.

FIG. 13 is a graph for obtaining the light distribution of the headlight of the present invention, and illustrates the relationship between required road surface illumination and visible distance. The horizontal axis represents the visible distance L2 at the previously described actual distance, while the vertical axis represents road surface illumination K.

Using this graph, it is possible to obtain the required road surface illumination K from the visible distance L2 obtained in FIG. 12.

The location and light distribution of the high light intensity region can be obtained from the angle $\theta$ in the horizontal direction the angle $\beta$ in the vertical direction and the road surface illumination K.

Figure 14:
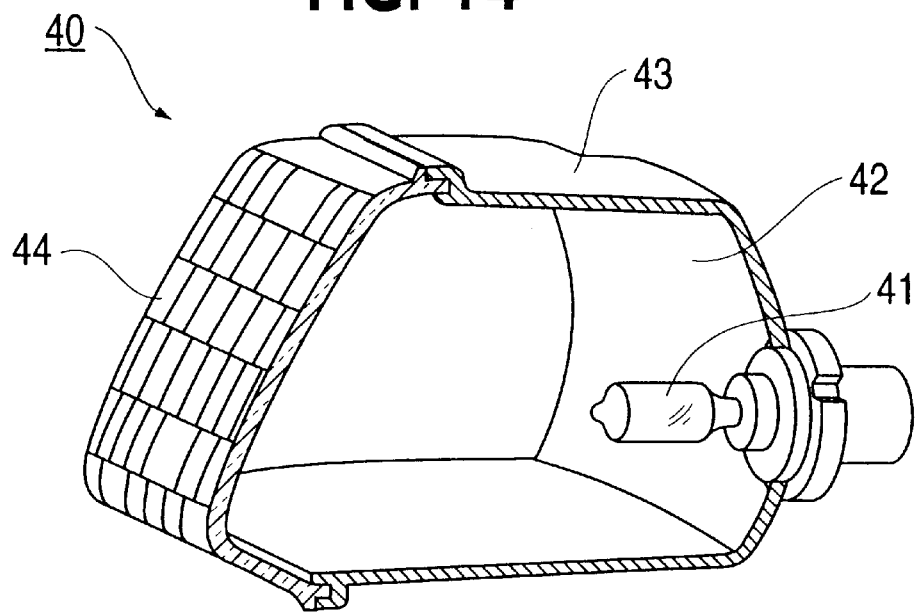
FIG. 14 is a perspective diagram illustrating a second embodiment of a headlight of the present invention.

FIG. 14 is a perspective drawing illustrating a second embodiment of the headlight of the present invention. The headlight 40 is includes a lightbulb 41, a reflector 42, a housing 43 integrally formed with the reflector 42, and a lens 44. Light distribution is carried out by a plurality of prisms formed in the lens 44, and a high light intensity region is also formed by at least some of the prisms.

The formation of the prisms for the high light intensity region can be carried out according to conventional technology, and the high light intensity region can be easily formed.

Figure 15:
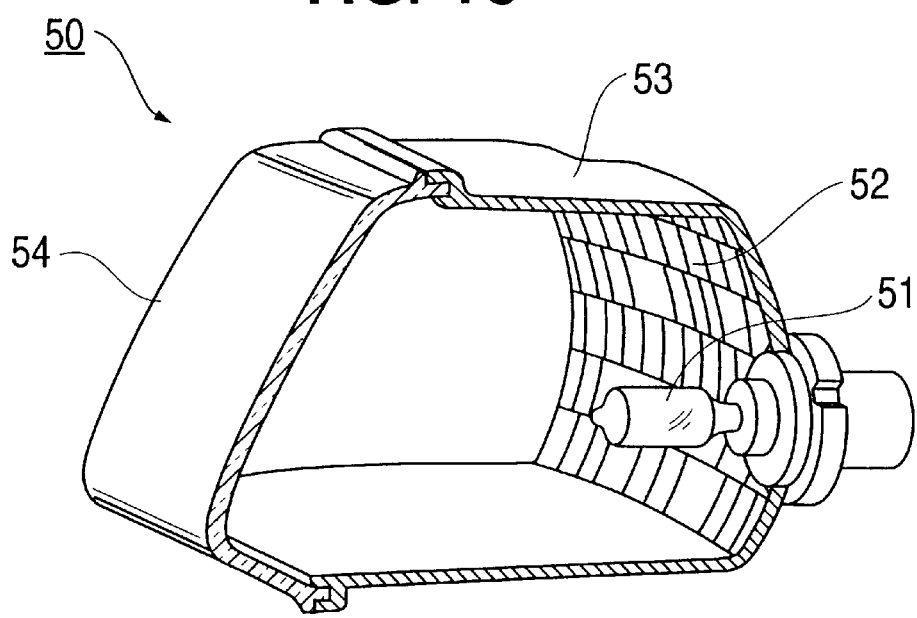
FIG. 15 is a perspective diagram illustrating a third embodiment of a headlight of the present invention.

FIG. 15 is a perspective drawing illustrating a third embodiment of the headlight of the present invention. The headlight 50 is includes a lightbulb 51, a reflector 52, a housing 53 integrally formed with the reflector 52, and a lens 54. There is either a multi-reflector type reflector having a plurality of reflecting surfaces formed in the reflector 52, or a single curved surface type reflector in which the reflecting surface of the reflector 52 is formed as a single curved surface, and at least part of the reflector 52 also forms a high light intensity region.

The formation of the reflecting surface of the reflector 52 for the high light intensity region can be formed according to conventional technology, and the high light intensity region can be easily formed.

Figure 16:
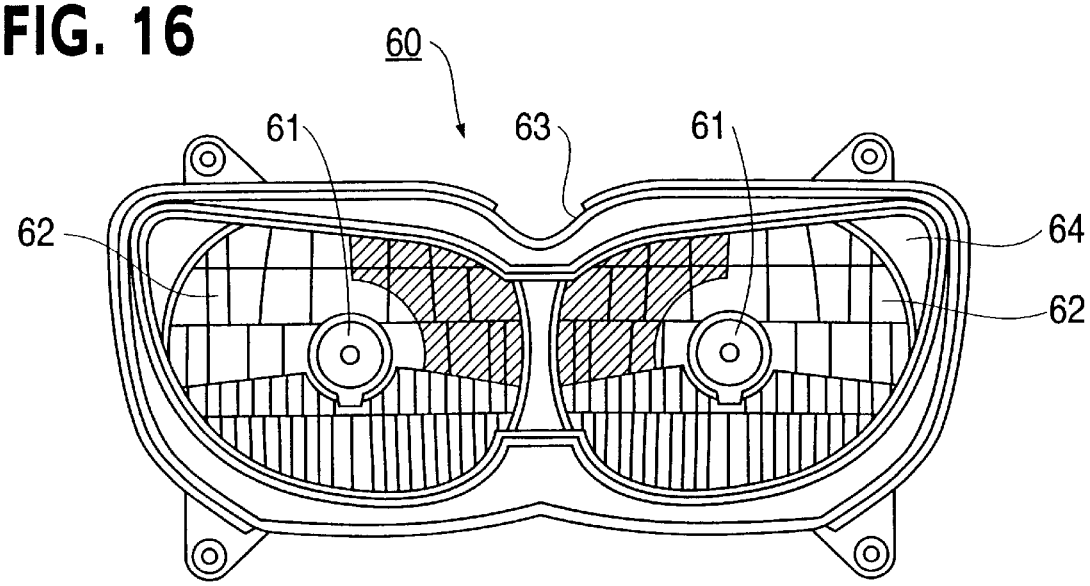
FIG. 16 is a front elevation view illustrating a fourth embodiment of a headlight according to the present invention.

FIG. 16 is a perspective drawing illustrating a fourth embodiment of the headlight of the present invention. The headlight 60 includes a lightbulb 61, reflectors 62, 62, a housing 63, and a lens 64.

Figure 17:
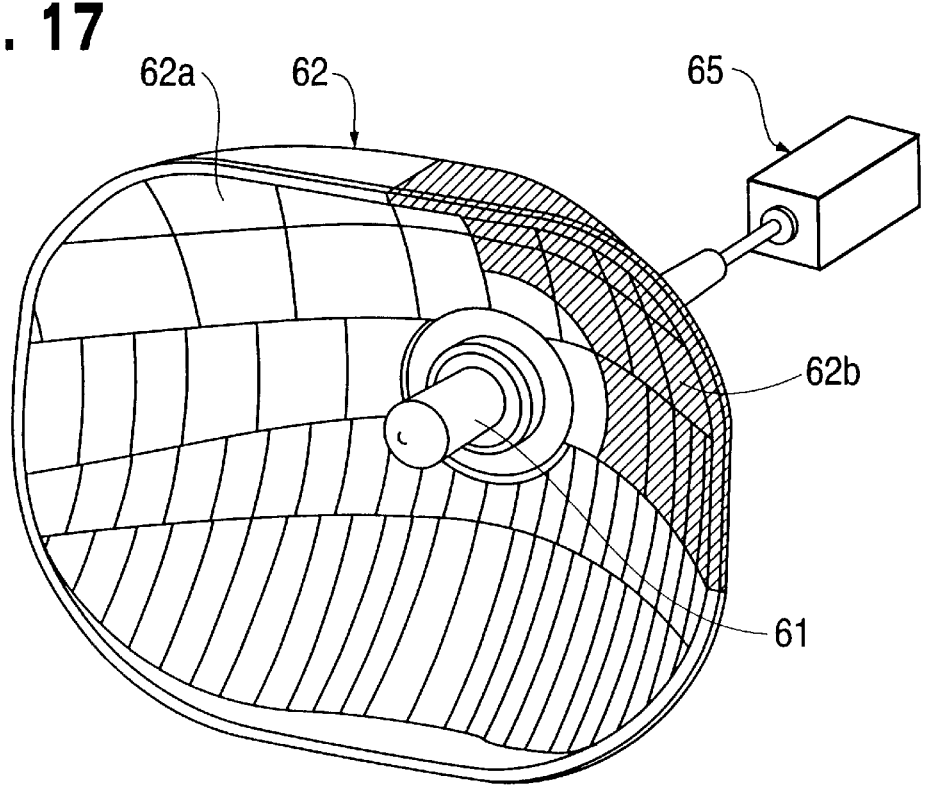
FIG. 17 is a perspective drawing illustrating a reflector section of the fourth embodiment of the headlight according to the present invention.

FIG. 17 is a perspective drawing illustrating the reflector section of the fourth embodiment of a headlight according to the present invention, and the reflector 62 comprises a reflector body 62a and a movable section 62b that is movable in the forward and backward directions.

The movable section 62b is provided with a backward direction reflector driving unit 65, and the movable section 62b can be moved from a first position when the motorcycle is travelling straight on to a second position when the motorcycle is cornering, by this reflector driving unit 65. The high light intensity region is formed at the second position.

Figure 18A:
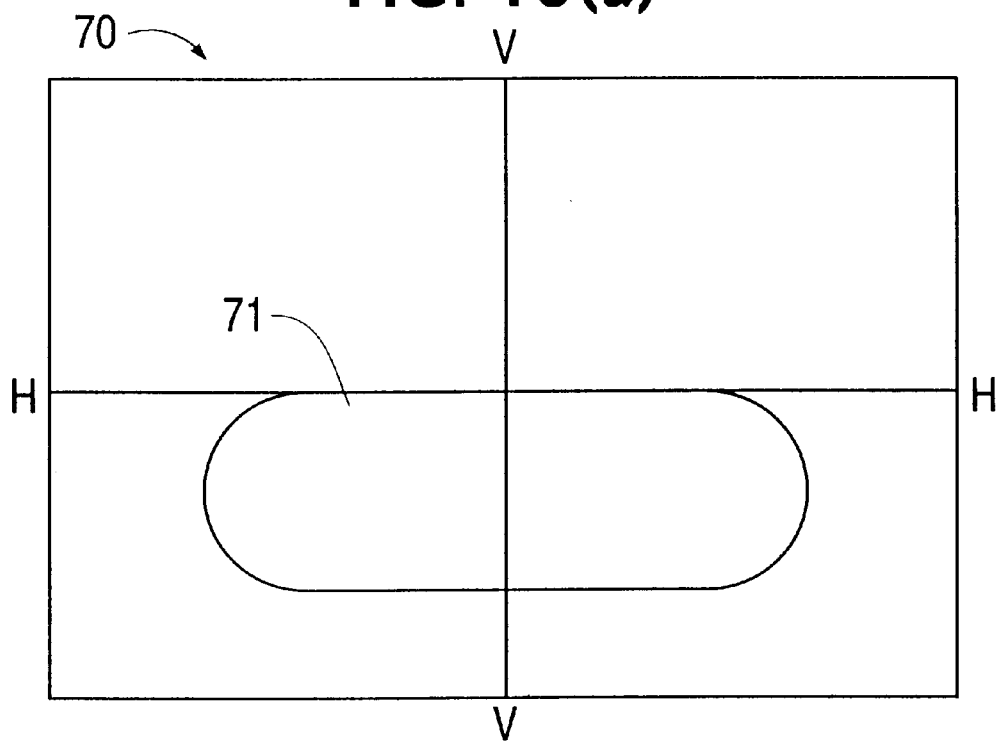
Figure 18B:
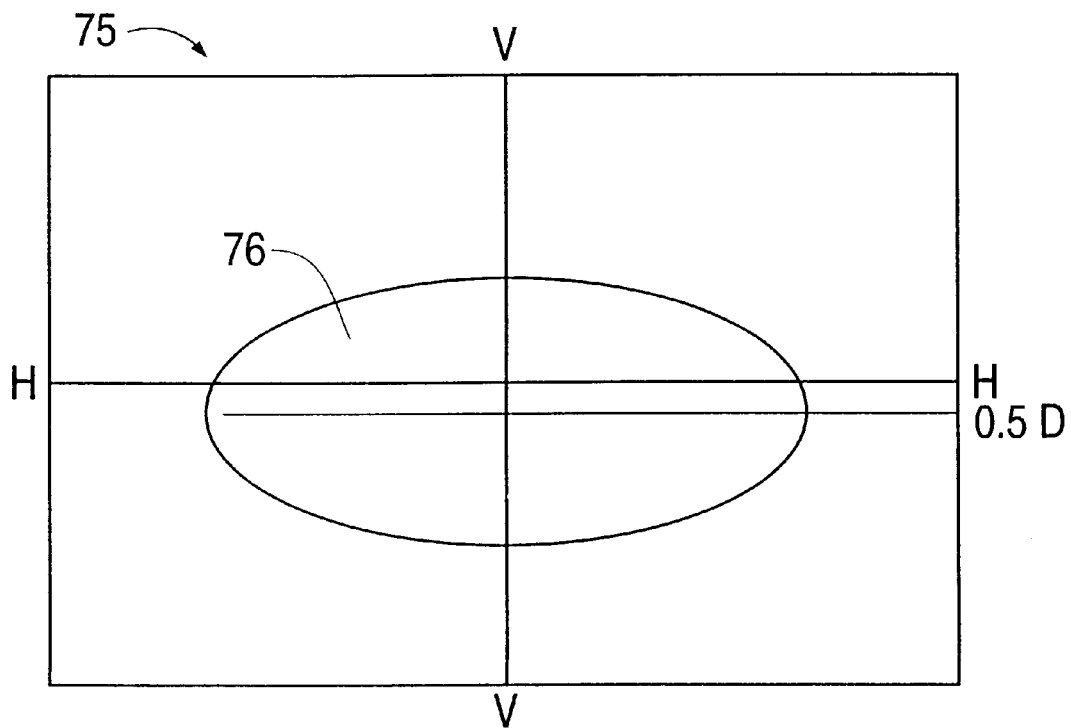
Figure 21A:
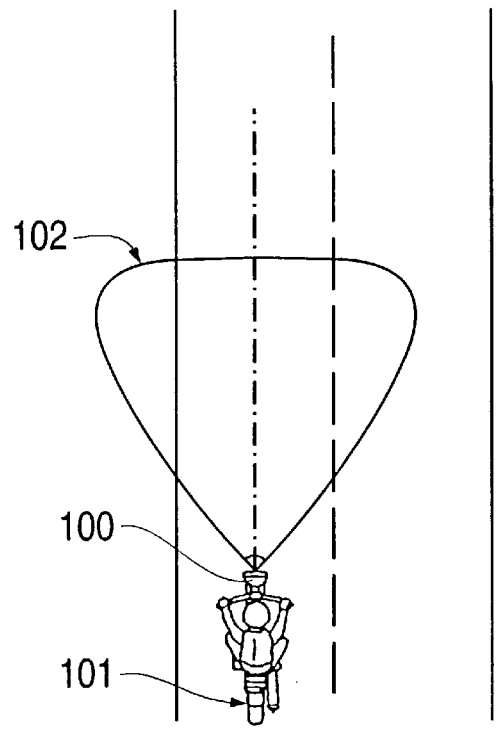
FIGS. 21(a) and 21(b) are overhead views illustrating light distribution for a clipped beam of a conventional motorcycle headlight.
Figure 21B:
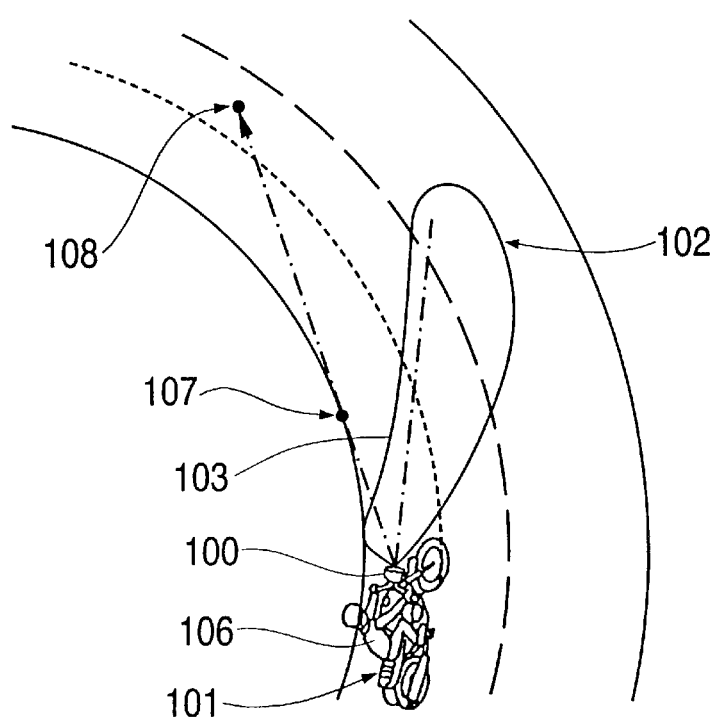
Figure 22A:
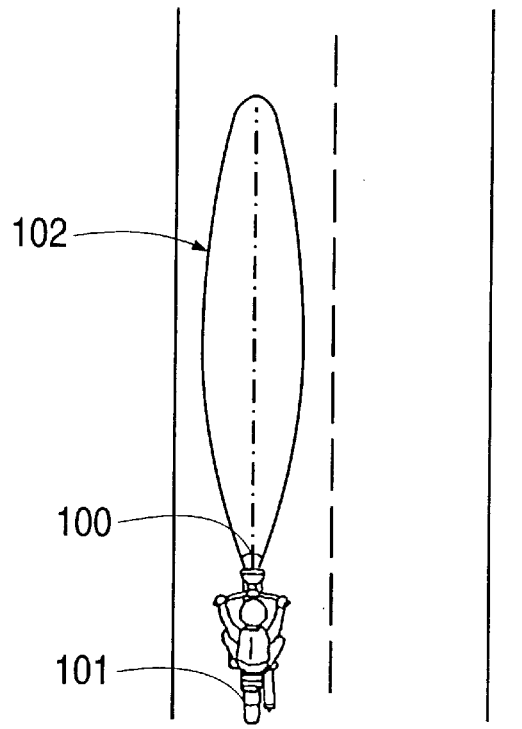
FIGS. 22(a) and 22(b) are overhead views illustrating light distribution for a main beam of a conventional motorcycle headlight.
Figure 22B:
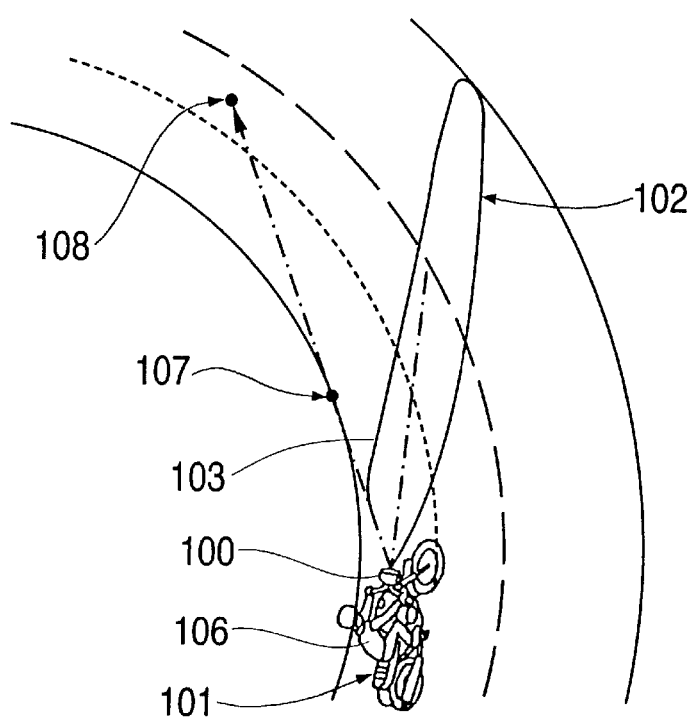
Figure 23A:
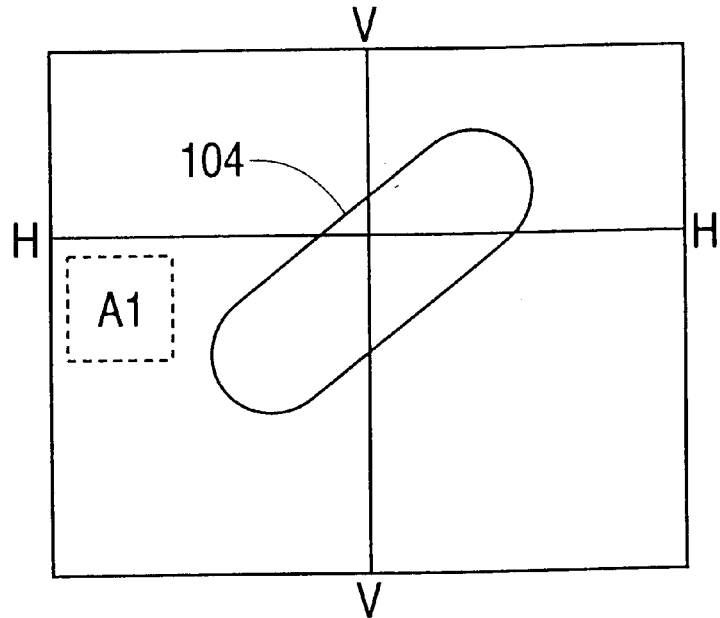
FIGS. 23(a) and 23(b) are drawings illustrating a light distribution screen for a conventional motorcycle headlight when cornering.
Figure 23B:
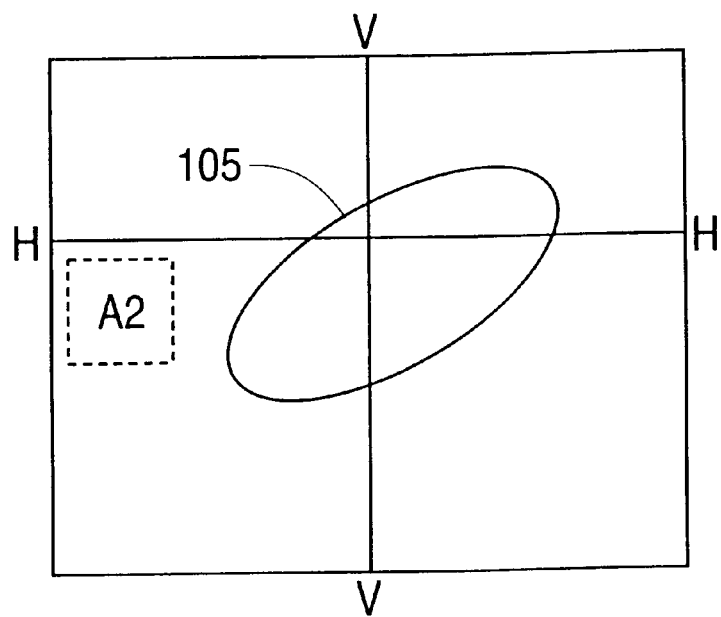

FIG. 18(a) and FIG. 18(b) are drawings illustrating the light distribution screen of the fourth embodiment of a headlight according to the present invention, when travelling straight on. FIG. 18(a) illustrates a dimmed beam, while FIG. 18(b) illustrates a main beam.

In FIG. 18(a), the light distribution screen 70 of the headlight 60 is lower than the line H, and is provided with a main light distribution region 71 including a main optical axis.

In FIG. 18(b), the light distribution screen 75 of the headlight 40 is provided with an elliptical main light distribution region 76 having a long axis at a position 0.5D below the line H and a short axis on the line V.

Next, the operation of the above described headlight 60 will be described. FIGS. 19(a) and 19(b) illustrates light distribution screens for a dimmed beam of the headlight of the fourth embodiment of the present invention, when cornering. FIG. 19(a) illustrates when the headlight leans to the left, and FIG. 19(b) illustrates the case when the headlight leans to the right.

In FIG. 19(a), the frame of the motorcycle leans to the left when the motorcycle is cornering around a left corner. As a result, the headlight 60 also leans. At this time, the main light distribution region 81 of the light distribution screen 80 is an inclined version of the light distribution screen 71 shown in FIG. 18(a), and the light in the main light distribution region 71 in the range A5 which is above the line H is blocked out as a result of the fact that the movable section 62b of the reflector 62, as illustrated in FIG. 17, is caused to move.

After the movable section 62b has moved, the light in the range A5 forms the high light intensity region 82. This high light intensity region 82 is obtained using the light intensity determining method described in FIG. 9—FIG. 13. Namely, the convergence of a number of points (βU−θL) leaning at angles b downward from the line H. and at angles θ from the line V in a leftward direction, obtained from the previously described speed v, radius R1, etc., gives the high light intensity region 82.

In FIG. 19(b), the headlight 60 leans to the right when the motorcycle is cornering around a right corner, opposite to FIG. 19(a), and the main light distribution region 86 of the light distribution screen 85 has the range A4 above the line H blocked by the movable section 62b of the reflector 62 which is caused to move in a different direction to that described in FIG. 19(a).

After the movable section 62b has moved, the light in the range A4 forms the high light intensity region 87. This high light intensity region 87 is similarly obtained using the light intensity determining method described in FIG. 9—FIG. 13. Namely, the convergence of points (βU−θL) inclined at angles b downward from the H line, and at angles θ from the line V in a rightward direction gives the high light intensity region 87.

FIG. 20(a) and FIG. 20(b) illustrate light distribution screens for a main beam of the first embodiment of a headlight of the present invention, when cornering. FIG. 20(a) illustrates the case when the headlight leans to the left while FIG. 20(b) illustrates the case when the headlight leans to the right.

In FIG. 20(a), the frame of the motorcycle leans to the left when the motorcycle is cornering around a left corner. As a result, the headlight 60 also leans. At this time, the main light distribution region 91 of the light distribution screen 90 is an inclined version of the light distribution screen 76 as illustrated in FIG. 18(b), and the light in the main light distribution region 76 in the range A5 which is above the line H is blocked out as a result of the fact that the movable section 62b of the reflector 62 is caused to move.

After the movable section 62b has moved, the light in the range A5 forms the high light intensity region 92. In FIG. 20(b), the headlight 60 leans to the right when the motorcycle is cornering around a right corner, opposite to FIG. 20(a), and the main light distribution region 96 of the light distribution screen 95 has the range A6 above the line H blocked by the movable section 62b of the reflector 62 which is caused to move in a different direction to that described in FIG. 19(b). After the movable section 62b has moved, the light in the range A6 forms the high light intensity region 97.

In this way, when the vehicle is cornering, the high light intensity regions 82, 87, 92 and 97 can be formed using light at places where light distribution is not necessary, and places that are too bright, and the light can be effectively utilized.

The shape and location of the high light intensity regions of the present invention are not limited to those described here, and may differ to reflect a prescribed range of speed v, radius R1, road surface coefficient of friction, etc.

Also, as long as the headlights 10, 40, 50 and 60 have the same structure, the detailed construction thereof can be disregarded. Further, the method of moving the movable section 62b of the headlight 60 is not limited to being in the forward and backward direction, and it is also possible to rotate it, or deflect it laterally or vertically, the most important point being that it can be moved so as to light up the shoulder of a corner or the vicinity thereof when cornering.

The present invention exhibits the following effects due to the above described construction. In the motorcycle headlight of the present invention, because the light distribution screen is constructed of a main light distribution region including a main optical axis, a low light intensity region darker than an upper part of the main light distribution region, and a high light intensity region brighter than an upper region of the low intensity region, a corner can be brightly illuminated when the motorcycle is cornering, which means that the visibility of the corner can be improved and oncoming traffic is not dazzled when the motorcycle is travelling straight on.

In the motorcycle headlight of the present invention, because the high light intensity region is provided with a region where the light distribution is at least 200 candela at an upper side from 4U, it is possible to ensure sufficient brightness when cornering.

In the motorcycle headlight of the present invention, because the high light intensity region is outside 10R and outside 10L, it is possible to prevent light from the high light intensity region entering the rearview mirror of a car or motorcycle stopped in front, when waiting at a traffic light, etc.

In the motorcycle headlight of the present invention, since the high light intensity region does not exceed 1000 candela, it is difficult for light from the high intensity light region to dazzle oncoming vehicles.

In the motorcycle headlight of the present invention, because the headlight carries out light distribution using a plurality of prisms formed in a lens, and the high light intensity region is formed using at least some of the prisms, the high light intensity region can be formed easily.

In the motorcycle headlight of the present invention, because the headlight is a projector type, and the high light intensity region is formed by providing non-shielded portions in a light shielding section contained inside the headlight, in order to form a dimmed beam pattern, it is possible to form the high light intensity region easily, and it is possible to effectively utilize shielded light. In the motorcycle headlight of the present invention, since the headlight is either a multi-reflector type having a plurality of reflecting surfaces formed in a reflector, or a single curved surface reflector type having a reflecting surface of a reflector as a single curved surface, and said high light intensity region is formed at part of said reflector, the high light intensity region can be formed easily.

In the motorcycle headlight of the present invention, because part of a reflector is divided, this divided portion is constructed so as to be movable from a first position when a vehicle is travelling straight on to a second position when the vehicle is cornering, and the high light intensity region is formed at the second position, it is possible to form the high light intensity region using light for a place where light distribution becomes unnecessary when a vehicle is cornering or light for a place that is too bright, and it is possible to effectively utilize the light.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A headlight for a motorcycle having a main optical axis that is caused to be aligned lower than a line H with a light distribution screen when a motorcycle frame is upright, wherein said light distribution screen comprises:

a main light distribution region including the main optical axis;

a low light intensity region darker than an upper part of said main light distribution region; and a high light intensity region brighter than an upper region of said low intensity region, said highlight intensity region provided with a portion having a light intensity region of at least 200 candela at an upper side of 4U.

2. The motorcycle headlight as disclosed in claim 1, wherein said high light intensity region is outside 10R and outside 10L.

3. The motorcycle headlight as disclosed in claim 1, wherein light distribution of said high light intensity region does not exceed 1000 candela.

4. The motorcycle headlight as disclosed in claim 2, wherein light distribution of said high light intensity region does not exceed 1000 candela.

5. The motorcycle headlight as disclosed in claim 1, wherein said headlight carries out light distribution using a plurality of prisms formed in a lens, and said high light intensity region is formed using at least some of said prisms.

6. The motorcycle headlight as disclosed in claim 2, wherein said headlight carries out light distribution using a plurality of prisms formed in a lens, and said high light intensity region is formed using at least some of said prisms.

7. The motorcycle headlight as disclosed in claim 3, wherein said headlight carries out light distribution using a plurality of prisms formed in a lens, and said high light intensity region is formed using at least some of said prisms.

8. The motorcycle headlight as disclosed in claim 1, wherein said headlight is a projector type, and the high light intensity region is formed by providing non-shielded portions in a light shielding section contained inside the headlight, in order to form a dimmed beam pattern.

9. The motorcycle headlight as disclosed in claim 2, wherein said headlight is a projector type, and the high light intensity region is formed by providing non-shielded portions in a light shielding section contained inside the headlight, in order to form a dimmed beam pattern.

10. The motorcycle headlight as disclosed in claim 3, wherein said headlight is a projector type, and the high light intensity region is formed by providing non-shielded portions in a light shielding section contained inside the headlight, in order to form a dimmed beam pattern.

11. The motorcycle headlight as disclosed in claim 1, wherein said headlight is at least one of a multi-reflector type having a plurality of reflecting surfaces forming a reflector and a single curved surface reflector type having a single curved surface as a reflecting surface, and said high light intensity region is formed at part of said reflector.

12. The motorcycle headlight as disclosed in claim 2, wherein said headlight is at least one of a multi-reflector type having a plurality of reflecting surfaces forming a reflector and a single curved surface reflector type having a single curved surface as a reflecting surface, and said high light intensity region is formed at part of said reflector.

13. The motorcycle headlight as disclosed in claim 3, wherein said headlight is at least one of a multi-reflector type having a plurality of reflecting surfaces forming a reflector and a single curved surface reflector type having a single curved surface as a reflecting surface, and said high light intensity region is formed at part of said reflector.

14. The motorcycle headlight as disclosed in claim 1, wherein part of a reflector includes a divided portion and the divided portion is constructed so as to be movable from a first position when a vehicle is travelling straight on to a second position when the vehicle is cornering, and said high light intensity region is formed at the second position.

15. The motorcycle headlight as disclosed in claim 2, wherein part of a reflector includes a divided portion and the divided portion is constructed so as to be movable from a first position when a vehicle is travelling straight on to a second position when the vehicle is cornering, and said high light intensity region is formed at the second position.

16. The motorcycle headlight as disclosed in claim 3, wherein part of a reflector includes a divided portion and the divided portion is constructed so as to be movable from a first position when a vehicle is travelling straight on to a second position when the vehicle is cornering, and said high light intensity region is formed at the second position.

\* \* \* \* \*